US010787577B2

(12) United States Patent
Reichwagen

(10) Patent No.: US 10,787,577 B2
(45) Date of Patent: Sep. 29, 2020

(54) METHOD FOR PROTECTING SURFACES

(75) Inventor: Claudia Reichwagen, Ahlen (DE)

(73) Assignee: BonaDea Biotechnologie UG, Ahlen (DE)

(*) Notice: Subject to any disclaimer, the term of this patent is extended or adjusted under 35 U.S.C. 154(b) by 0 days.

(21) Appl. No.: 14/240,623

(22) PCT Filed: Aug. 27, 2012

(86) PCT No.: PCT/EP2012/003594
§ 371 (c)(1),
(2), (4) Date: May 7, 2014

(87) PCT Pub. No.: WO2013/026581
PCT Pub. Date: Feb. 28, 2013

(65) Prior Publication Data
US 2014/0245924 A1 Sep. 4, 2014

(30) Foreign Application Priority Data

Aug. 25, 2011 (DE) .......................... 10 2011 111 179
Jan. 31, 2012 (DE) .......................... 10 2012 001 729
Aug. 17, 2012 (DE) .......................... 10 2012 016 275

(51) Int. Cl.
C09D 5/00 (2006.01)
C09D 105/04 (2006.01)
C09D 105/12 (2006.01)
C09D 105/00 (2006.01)
B05D 5/00 (2006.01)

(52) U.S. Cl.
CPC .............. C09D 5/008 (2013.01); B05D 5/00 (2013.01); C09D 105/00 (2013.01); C09D 105/04 (2013.01); C09D 105/12 (2013.01)

(58) Field of Classification Search
CPC . A23B 4/06; A23B 7/16; D21H 19/00; A61K 9/36; C09D 5/008
USPC .................. 426/89, 102, 541, 615; 524/445; 424/479
See application file for complete search history.

(56) References Cited

U.S. PATENT DOCUMENTS

| 3,266,906 | A | * | 8/1966 | Miller | A23L 1/0532 426/330 |
| 3,455,701 | A | * | 7/1969 | Rocks | A23L 1/0532 426/575 |
| 4,196,219 | A | * | 4/1980 | Shaw | A23B 4/08 426/100 |
| 5,792,090 | A | * | 8/1998 | Ladin | A61F 13/02 424/449 |
| 6,159,512 | A | * | 12/2000 | Reyes | A23B 7/08 426/102 |
| 6,187,290 | B1 | * | 2/2001 | Gilchrist | A61K 9/122 424/443 |
| 6,709,713 | B2 | * | 3/2004 | Augello | A61K 9/286 424/464 |
| 2005/0014882 | A1 | * | 1/2005 | Brungardt | D21H 19/40 524/445 |
| 2008/0233057 | A1 | * | 9/2008 | Viladot Petit | A61K 8/11 424/49 |
| 2009/0053497 | A1 | * | 2/2009 | McQuade | C09D 5/008 428/220 |

FOREIGN PATENT DOCUMENTS

| CN | 101381470 | * | 3/2009 | ............. C08J 5/18 |
| JP | 08112576 | * | 5/1996 | ............. B08B 7/00 |

OTHER PUBLICATIONS

Lazarus et al., Evaluation of a Calcium Alginate Coating and a Protective Plastic Wrapping for the Control of Lamb Carcass Shrinkage, 1976, Journal of Food Science, pp. 639-641.*

* cited by examiner

Primary Examiner — Dah-Wei D. Yuan
Assistant Examiner — Andrew J Bowman
(74) Attorney, Agent, or Firm — Brooks Kushman P.C.

(57) ABSTRACT

The invention relates to a method for the protection of surfaces against damage by applying a protective layer, wherein said surface is brought into contact with an aqueous polysaccharide solution having gelatinizing properties.

13 Claims, No Drawings

METHOD FOR PROTECTING SURFACES

The invention relates to a method for the protection of delicate surfaces against damage by applying a protective layer.

It is common industrial practice to coat sensitive technical surfaces with film or sheeting to protect them against corrosion and damage. In this case plastic film is widely employed for this purpose which is removed and disposed of when the relevant products are supplied or sold. The surfaces to be protected are usually paint coated surfaces, for example of automobiles.

Disadvantages of such film coatings are on the one hand time and effort invested and moreover, the disposal of the plastic material. Peeling off the plastic film or sheeting before the product is delivered to customers is not only cumbersome but also time consuming and costly. As a rule, the film material is not biologically degradable but has to be recycled or disposed of otherwise.

In case of automobiles protective film of the kind described above only offers protection to a limited degree; when in contact with hard objects the protective film is often penetrated or pierced causing the paint coat underneath to become damaged.

For this reason, there is need for protective coatings or coverings that do not have the disadvantages referred to above and can thus be easily removed and disposed of.

It is, therefore, the objective of the present invention to provide easily scratched surfaces with a protective film that can be easily degraded biologically, is not sticky, also withstands higher temperatures, and can be removed by means of water.

This objective is accomplished by a method of the kind first mentioned above, wherein the surface to be protected is brought into contact with an aqueous alginate solution having gelling properties and metal ions causing the alginate to gelatinize.

As an alternative, the surface to be protected is brought into contact with a heated aqueous solution of agarose, carrageenan and/or gellan with gelling taking place when cooling. For cooling purposes it is usually sufficient to apply the agarose solution to a cold surface, Especially in the case of carrageenan and gellan the gelling process is enhanced by alkaline and alkaline earth ions.

The method provided by the invention can be employed for all surfaces that shall be protected against damage, especially scratching. However, the surfaces should be resistant to moisture.

All the coating agents referred to above are natural polysaccharides which can be modified in a known manner.

Alginic acid is a high-molecular natural product consisting of α-L-guluronic acid and β-D-mannuronic acid whose mean molar mass may range between approximately 40,000 and approximately 200,000. While the free acid as a white solid is primarily insoluble in water the alkaline salts and in particular the sodium salt are water soluble. 3% solutions can be prepared without difficulty but these may become very viscous as the alginate concentration increases.

Alginic acid is produced by brown algae and a number of bacteria types and is available in large amounts at low cost. A special property of the alginates is the embedding of polyvalent metal ions, for example $Ca^{2+}$ ions, which takes place by forming a spatial structure and results in the gelling and precipitation of the alginate from the aqueous solution. The reaction is very fast and reversible; removing the calcium ions from the alginate matrix causes the alginate to be water soluble again and thus capable of being washed off.

As sequestrant bringing about the liberation of the calcium ions EDTA may be used for example but also citrate.

The gelation may as well be induced by other metal ions, for example alkaline earth metal ions, zinc ions, aluminum ions, and ferrous and ferric ions.

Hitherto, alginates have found their applications in the foodstuff industry, in the field of medical technology (capsules), textile industry, in photographic paper manufacture, and for molding purposes. So far, protective alginate films have not yet been known.

Agarose is a high-molecular natural product, a polysaccharide consisting of D-galactose and 3,6-anhydro-L-galactose linked with each other glycosidically, that may have a mean molar mass ranging between approx. 110,000 and 160,000 D. Agarose is easily dissolved in hot water. 3% solutions can be readily prepared but these may become very viscous as the agarose concentration increases.

Agarose is obtained from the red algae genera *gelidium* and *gracilaria* and is available in large amounts at low cost. A special property of agarose is that its solutions have a firm and jelly-like consistency also at elevated temperatures. Agarose solutions are liquid at 95° C. and congeal at 45° C. Commercially available agar contains agarose as main component.

Carrageenan is a polysaccharide having a molar weight of up to 1,000,000 D which is also made up of galactose and 3,6-anhydro-galactose units partly carrying sulfate groups. Carrageenan is obtained from red algae and occurs in a number of variants. Kappa- and iota-carrageenan in conjunction with potassium, sodium, and calcium ions form solid gels.

Gellan is a polysaccharide of a molar weight of approximately 500,000 D consisting of phamnose-, glucuronic acid- and glucose units. It is produced by fermentation of carbohydrates with *Pseudomonas elodea*. Gellan is water soluble at elevated temperatures and forms stable gels already at a concentration of 0.1% in water.

Agarose is nowadays used in the food processing industry, in molecular biology for gel electrophoresis, in microbiology for nutrient media, and for plant cultivation purposes. Agarose protective films have not yet been known so far. Gellan is employed as gelling agent in the food processing industry, carrageenan as gelling and thickening agent.

As aqueous alginate solution to be used in accordance with the invention especially a sodium alginate solution in water is suitable, said solution may contain alginate in the amount of 0.3 to 3%, in particular approx. 1%.

It is to be noted in this context that all percentage information in this application is meant to express percentages by weight.

The metal ion preferred for the gelling of alginate is the $Ca^{2+}$ ion. Especially calcium chloride in aqueous solution is used, for example as a 0.3 to 3% solution in water and in particular as a solution of approx. 1%.

Alginate solution and metal ions may be applied to the surface to be protected in optional sequence. This means, the surface may first be treated with an aqueous solution of metal ions onto which the alginate solution is sprayed subsequently so that gelation is brought about. Alternatively, this may as well take place in reverse order, in that the aqueous alginate solution is first spray applied to the surface followed by applying the metal ion solution. Furthermore, both solutions may also be applied in parallel, however separately. Especially preferred for application are spraying techniques.

Solutions which may also be used in accordance with the invention are solutions in water that contain 0.1 to 3% agarose, carrageenan and/or gellan, in particular about 1%. These solutions may also be combined with alginate solutions.

The gel that is thus produced dries with water losses occurring and the protective coat forming into non-transparent dry film or, if applicable, foam. As per a special embodiment the method results in a foam forming on the surface to be protected. This may be achieved in that the relevant solution is mechanically expanded which is possible without problems due to the relatively high viscosity. Foam stabilizers may help in this case, for instance sodium dodecyl sulfate or ammonium stearate. The foam may then be stabilized to form a protective layer, if expedient with the help of metal ions, said layer comprising many pores.

Alternatively or additionally, calcium carbonate in the form of finely grained powder can be dispersed into an alginate foam or aqueous alginate solution. After such a solution doped with calcium carbonate has been applied calcium ions can be liberated by spray application of a weak solution. This also leads to gelling and at the same time foaming due to the liberation of $CO_2$. Suitable as weak acid is gluconic acid, for example. Other weak organic acids may also be employed provided they do not attack the surface. This applies analogously to carrageenan, agarose- and gellan solutions or foams.

For the purpose of gelation, preferably potassium and calcium salts are employed with kappa-carrageenan, calcium salts with iota-carrageenan.

It may be advantageous to provide the surfaces to be coated with an anti-adhesive and apply the protective layer to such an intermediate layer. For the anti-adhesive layers Teflon, silicone and other customary materials are considered appropriate.

The aqueous polysaccharide solution as described above can be provided with a biocide to prevent or guard against the growth of bacteria or fungi. The biocides in this case are of customary nature.

Generally speaking, the protective layer formed in accordance with the inventive method is 0.1 to 5 mm thick, in particular between 0.5 and 2 mm. In this context, layers of greater thickness preferably have a foam structure. In the event that there is no formation of foam the required layer thickness may be brought about by repeatedly applying the protective layer forming agents.

The protective layer or coat applied in accordance with the invention can be removed by means of a high-pressure cleaner, where applicable after a sequestrant has been added as mentioned hereinbefore and/or at elevated temperatures.

The inventive method is particularly useful for the protection of paint-coated surfaces of technical products such as automobiles straight from the factory.

Another field of use is the coating of surfaces wherein additional materials are applied to the protective film. In this case the polysaccharide film acts as separating layer. In this way, for example cast concrete and formwork can be separated from each other. This applies analogously to other casting or pouring methods.

Moreover, the invention relates to the use of polysaccharide gels containing, if applicable, metal ions for the protection of technical surfaces, in particular paint coats, especially preferred of automobiles.

Precursors required for the inventive method, for instance sodium alginate and calcium chloride, may be kept in stock in the form of water-soluble powder. Sodium alginate itself is water soluble and forms a very thin layer when it has dried. The solubility in water is substantially impeded when metal ions are added so that the protective film can no longer be readily washed off and removed.

Carrageenan, agarose, and gellan may be kept in stock in the form of water-soluble powder. Agarose and gellan are water soluble at higher temperature and form a very thin layer when dry. The solubility in water is substantially impeded at room temperature so that the protective film can no longer be readily washed off and removed.

The solution to be used can be adjusted to various viscosities which is of significance with respect to the thickness of the layer to be applied to the object to be protected. The protective film itself is stable, not sticky, and does not leave any traces when touched or after it has been removed. It can be removed easily with the aid of aqueous cleaning agents and, if necessary, a sequestrant. It may be applied to all painted, polished, and otherwise treated surfaces which are not sensitive to water.

As is common practice corrosion inhibitors, UV protective agents, filler substances, and the like may be admixed to the precursors.

Suitable filler substances are, for example, Aerosil (fumed/pyrogenic silica), $TiO_2$, nutshell and coconut shell meal. The amount is in the range of between 0.1 and 0.5% w/w. Admixing the filler substances will enhance the tear resistance of the film altogether.

To increase the flexibility of the film glycerin can be added in an amount of up to 2% w/w, in particular approx. 1% w/w.

The invention claimed is:

1. Method for the protection of a surface of a new automobile against damage by application of a protective layer comprising the steps of
    bringing the surface into contact with an aqueous alginate solution having gelatinizing properties, the aqueous solution comprising calcium carbonate in finely dispersed form, and
    releasing Ca2+ ions from said finely dispersed calcium carbonate by spraying with an acid that does not attack the surface,
    thereby forming a protective layer having a thickness ranging between 0.1 and 5 mm.

2. Method according to claim 1, characterized in that a sodium alginate solution in water is used with 0.3 to 3% w/w of alginate.

3. Method according to claim 1, characterized in that the aqueous solution is applied in the form of foam.

4. Method according to claim 1, characterized in that aqueous gluconic acid is used as weak acid.

5. Method according to claim 1, characterized in that the aqueous solution contains a biocide for the prevention of microbiological contamination.

6. Method according to claim 1, characterized in that the surface to be protected is primed with an anti-adhesive agent.

7. Method according to claim 1, characterized in that the thickness of the protective layer ranges between 0.5 and 2 mm.

8. Method according to claim 1 for the protection of paint-coated surfaces.

9. Method according to claim 5, characterized in that the surface to be protected is the body of an automobile.

10. The method of claim 2, wherein the % w/w of algenate is approximately 1.

11. The method of claim 1, wherein the $Ca^{2+}$ ions are provided as calcium chloride in aqueous solution.

12. The method of claim 1, wherein the % w/w of calcium chloride in water is approximately 1.

13. Method according to claim 1 including the step of washing off the protective layer with water in the presence of a sequestrant.

\* \* \* \* \*